United States Patent
Hiraishi et al.

(10) Patent No.: US 10,474,734 B2
(45) Date of Patent: Nov. 12, 2019

(54) INFORMATION PROCESSING APPARATUS, INFORMATION PROCESSING METHOD, AND RECORDING MEDIUM

(71) Applicant: CANON KABUSHIKI KAISHA, Tokyo (JP)

(72) Inventors: Tomonobu Hiraishi, Tokyo (JP); Kanako Yamakawa, Kawasaki (JP); Satoko Saito, Kawasaki (JP); Atsushi Inoue, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 239 days.

(21) Appl. No.: 15/584,225

(22) Filed: May 2, 2017

(65) Prior Publication Data

US 2017/0337159 A1 Nov. 23, 2017

(30) Foreign Application Priority Data

May 19, 2016 (JP) ................................. 2016-100716

(51) Int. Cl.
| | | |
|---|---|---|
| *G06K 9/34* | (2006.01) | |
| *G06F 17/21* | (2006.01) | |
| *G06F 17/24* | (2006.01) | |
| *G06K 9/00* | (2006.01) | |
| *H04N 1/40* | (2006.01) | |
| *G06F 3/0482* | (2013.01) | |
| *G06F 3/0489* | (2013.01) | |

(52) U.S. Cl.
CPC ............ *G06F 17/21* (2013.01); *G06F 3/0482* (2013.01); *G06F 17/248* (2013.01); *G06K 9/00456* (2013.01); *H04N 1/40062* (2013.01); *G06F 3/0489* (2013.01)

(58) Field of Classification Search
None
See application file for complete search history.

(56) References Cited

U.S. PATENT DOCUMENTS

| | | | | |
|---|---|---|---|---|
| 5,185,699 | A * | 2/1993 | Reiner | G06F 17/22 715/201 |
| 8,705,897 | B1 * | 4/2014 | Chao | G06F 3/04817 382/305 |
| 2010/0204979 | A1 * | 8/2010 | Chiu | G06F 3/0481 704/3 |
| 2011/0258540 | A1 * | 10/2011 | Ueda | G06F 16/168 715/273 |
| 2012/0278704 | A1 * | 11/2012 | Ying | G06F 17/2247 715/243 |

FOREIGN PATENT DOCUMENTS

| | | |
|---|---|---|
| JP | 2007041944 A | 2/2007 |
| JP | 2011186927 A | 9/2011 |

* cited by examiner

*Primary Examiner* — Stephen P Coleman
(74) *Attorney, Agent, or Firm* — Venable LLP (57) ABSTRACT

An information processing apparatus includes: an inputting unit for inputting a text to be placed in a template; a storage unit for saving the text whenever a predetermined condition is detected; and a presenting unit for, when the template is switched, selecting the text from the storage unit based on an amount of a text that can be placed in the template after switching, and presenting the selected text as a candidate.

10 Claims, 11 Drawing Sheets

TEXT MANAGEMENT TABLE 300

| ITEM | DESCRIPTION | TYPE |
|---|---|---|
| nTextID | TEXT ID | INTEGER |
| nChangeID | EDIT HISTORY ID | INTEGER |
| nLineCount | NUMBER OF LINES | INTEGER |
| cWidth | MAX. NUMBER OF CHARACTERS IN LINE | INTEGER |
| cText | TEXT BODY | CHARACTER |
| nFlg | FINAL WORDING FLAG | INTEGER |

FIG. 3B

| nTextID | nChangeID | nLineCount | nWidth | cText | nFig |
|---|---|---|---|---|---|
| 1 | 1 | 1 | 43 | I VISITED CHIBA DURING THE SUMMER VACATION. | 0 |
| 1 | 2 | 2 | 43 | I VISITED CHIBA DURING THE SUMMER VACATION. I WENT OUT TO TAKE PHOTOS OF LANDSCAPES. | 0 |
| 1 | 3 | 2 | 43 | I VISITED CHIBA DURING THE SUMMER VACATION. I WENT OUT TO TAKE PHOTOS OF. | 0 |
| 1 | 4 | 2 | 43 | I VISITED CHIBA DURING THE SUMMER VACATION. I WENT OUT TO TAKE PHOTOS OF THE SEA. | 0 |
| 1 | 5 | 3 | 47 | I VISITED CHIBA DURING THE SUMMER VACATION. I WENT OUT TO TAKE PHOTOS OF THE SEA. IT IS STILL BEFORE 7:00AM, BUT IT IS HOT, 29°C. | 0 |
| 1 | 6 | 4 | 47 | I VISITED CHIBA DURING THE SUMMER VACATION. I WENT OUT TO TAKE PHOTOS OF THE SEA. IT IS STILL BEFORE 7:00AM, BUT IT IS HOT, 29°C. THE WAVES ARE HIGH DUE TO THE TYPHOON. | 0 |
| 1 | 7 | 4 | 69 | I VISITED CHIBA DURING THE SUMMER VACATION. I WENT OUT TO TAKE PHOTOS OF THE SEA. IT IS STILL BEFORE 7:00AM, BUT IT IS HOT, 29°C. THE WAVES ARE HIGH DUE TO THE TYPHOON. I SEE SURGING WAVES OFFSHORE. | 0 |
| 1 | 8 | 3 | 69 | I VISITED CHIBA DURING THE SUMMER VACATION. I WENT OUT TO TAKE PHOTOS OF THE SEA. THE WAVES ARE HIGH DUE TO THE TYPHOON. I SEE SURGING WAVES OFFSHORE. | 0 |
| 1 | 9 | 3 | 43 | I VISITED CHIBA DURING THE SUMMER VACATION. I WENT OUT TO TAKE PHOTOS OF THE SEA. THE WAVES ARE HIGH DUE TO THE TYPHOON. | 1 |
| 2 | 1 | 1 | 38 | I WORKED UP A SWEAT MOUNTAIN CLIMBING. | 0 |
| 2 | 2 | 1 | 25 | I WENT MOUNTAIN CLIMBING. | 1 |
| 3 | 1 | 1 | 38 | IT IS THE AQUARIUM IN KAMOGAWA, CHIBA. | 1 |

INFORMATION PROCESSING APPARATUS, INFORMATION PROCESSING METHOD, AND RECORDING MEDIUM

BACKGROUND OF THE INVENTION

Field of the Invention

The present invention relates to an information processing apparatus, an information processing method, and a recording medium and, more particularly, to an information processing apparatus, an information processing method, and a recording medium that process a text according to a template.

Description of the Related Art

Hitherto, there has been known an electronic book building system for building an electronic book in which a plurality of images and texts for the images are arranged on a plurality of pages. Many electronic book building systems include a plurality of templates built therein to reduce the workload on users.

These templates provide various layouts, such as a layout that secures a large text area that enables many texts to be arranged therein and a layout that has a limited text area so as to emphasize images. A user can easily create an electronic book by selecting a template that has a desired layout and arranging images and texts for the images according to the template.

Japanese Patent Application Laid-Open No. 2011-186927 describes an image editing device adapted to arrange a plurality of images and the texts for the images according to a predetermined order. When a layout is changed, the device adjusts the order of arrangement of the images and the texts according to the updated layout.

Japanese Patent Application Laid-Open No. 2007-41944 describes an image processing device adapted to place a plurality of images and the texts for the images in a template. If the number of characters of a text placed in a template exceeds an upper limit, the device performs processing, such as reducing a font size, expanding a text area, or changing a layout.

When creating an electronic book, there are cases where after editing a text according to a template, the template is switched to another template. In such a case, the amount of the edited text may not fit to the template after switching, and re-editing of the text may be required.

If the text area of the template after switching is larger than the text area of the template before switching, a blank space of the text area will be larger. This may urge a user to add a part that has been cut off or deleted during the editing to the text again. However, the user may not remember the contents of the part that has been deleted during the editing process, thus frequently resulting in a labor-intensive process to the user to re-edit the text.

SUMMARY OF THE INVENTION

An information processing apparatus according to an embodiment of the present invention includes: an inputting unit for inputting a text to be placed in a template; a storage unit for saving the text whenever a predetermined condition is detected; and a presenting unit for, when the template is switched, selecting the text from the storage unit based on an amount of a text that can be placed in the template after switching, and presenting the selected text as a candidate.

An information processing method according to an embodiment of the present invention includes: inputting a text to be placed in a template; saving the text in a storage unit whenever a predetermined condition is detected; and when the template is switched, selecting the text from the storage unit based on an amount of a text that can be placed in the template after switching and presenting the selected text as a candidate.

A non-transitory computer readable medium according to an embodiment of the present invention has a program recorded therein for causing an information processing apparatus to perform: inputting a text to be placed in a template; saving the text in a storage unit whenever a predetermined condition is detected; and when the template is switched, selecting the text from the storage unit based on an amount of a text that can be placed in the template after switching and presenting the selected text as a candidate.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

First, the configuration of an information processing apparatus according to the present embodiment will be described with reference to FIG. 1. An information processing apparatus 100 constitutes an electronic book building system together with an input unit 109 and a display unit 111.

Figure 1:
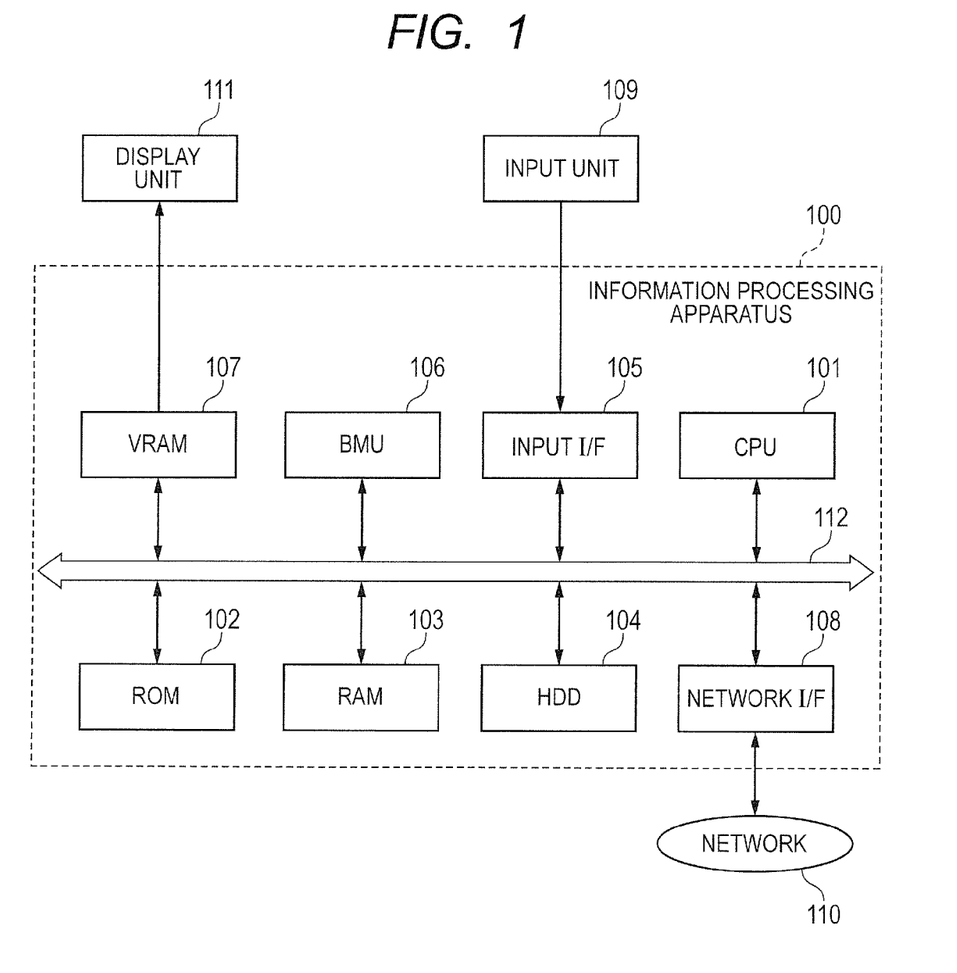
FIG. 1 is a block diagram illustrating the configuration of an information processing apparatus according to a first embodiment of the present invention.

FIG. 1 is a block diagram illustrating the configuration of the information processing apparatus 100 according to the present embodiment. The information processing apparatus 100 includes a central processing unit (CPU) 101, a read-only memory (ROM) 102, a random access memory (RAM) 103, a hard disk drive (HDD) 104, an input interface (I/F) 105, a bit move unit (BMU) 106, a video RAM (VRAM) 107, and a network I/F 108.

The CPU 101 is a processor that integrally controls the information processing apparatus 100. The CPU 101 reads predetermined programs from the ROM 102, the RAM 103, the HDD 104 and the like and executes the programs so as to control the operations of the units of the information processing apparatus 100.

The ROM 102 mainly stores programs requiring no changes and various types of data. The RAM 103 temporarily stores programs, data and the like supplied from external devices. The RAM 103 is used also as a work area for the CPU 101 and a load area of programs.

The HDD 104 stores basic programs, such as an operation system (OS), an application program for creating an electronic book (hereinafter referred to as "the photo app"), and contents data, such as image data and text data.

The input I/F 105 is connected to the input unit 109 to input information, such as the instructions and data from the input unit 109. The input unit 109 includes a pointing device, a keyboard and the like and accepts input operations performed by a user.

The BMU 106 controls the transfer of data among the memories and the transfer of data between the memories and input/output devices. For example, the BMU 106 controls the transfer of data between the VRAM 107 and the RAM 103, and the transfer of data between the RAM 103 and the network I/F 108.

The VRAM 107 temporarily stores an image to be displayed on a display unit 111 and outputs the image to the display unit 111 according to a predetermined rule. The display unit 111 includes a liquid crystal display, an organic light-emitting device or the like, and displays the image received from the VRAM 107.

The network I/F 108 is connected to a network 110 to exchange data with external computers, storages and the like through the network 110. The network 110 is a communication network, such as a local area network (LAN), the Internet or the like. A system bus 112 communicatively connects the units included the information processing apparatus 100.

Figure 2:
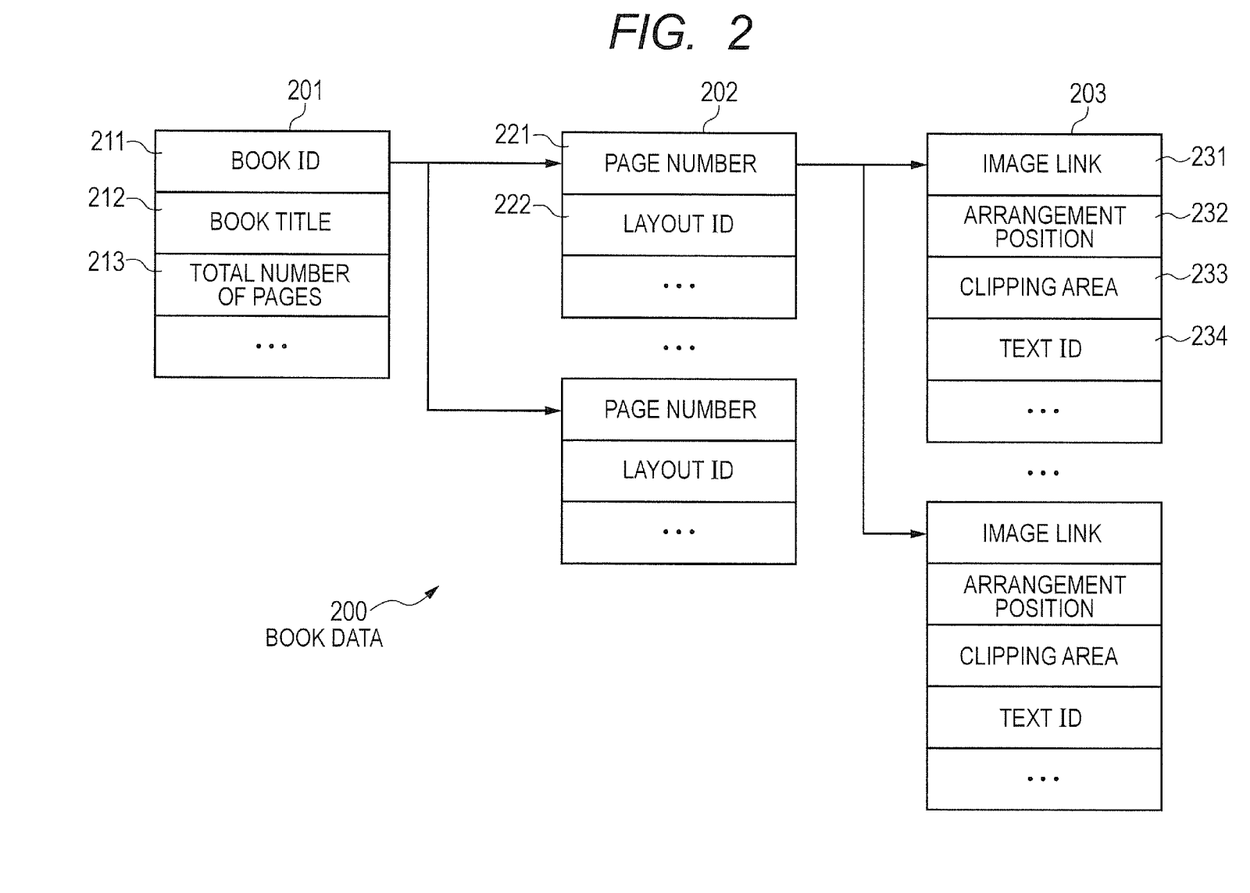
FIG. 2 illustrates an example of book data according to the first embodiment of the present invention.
Figure 3A:
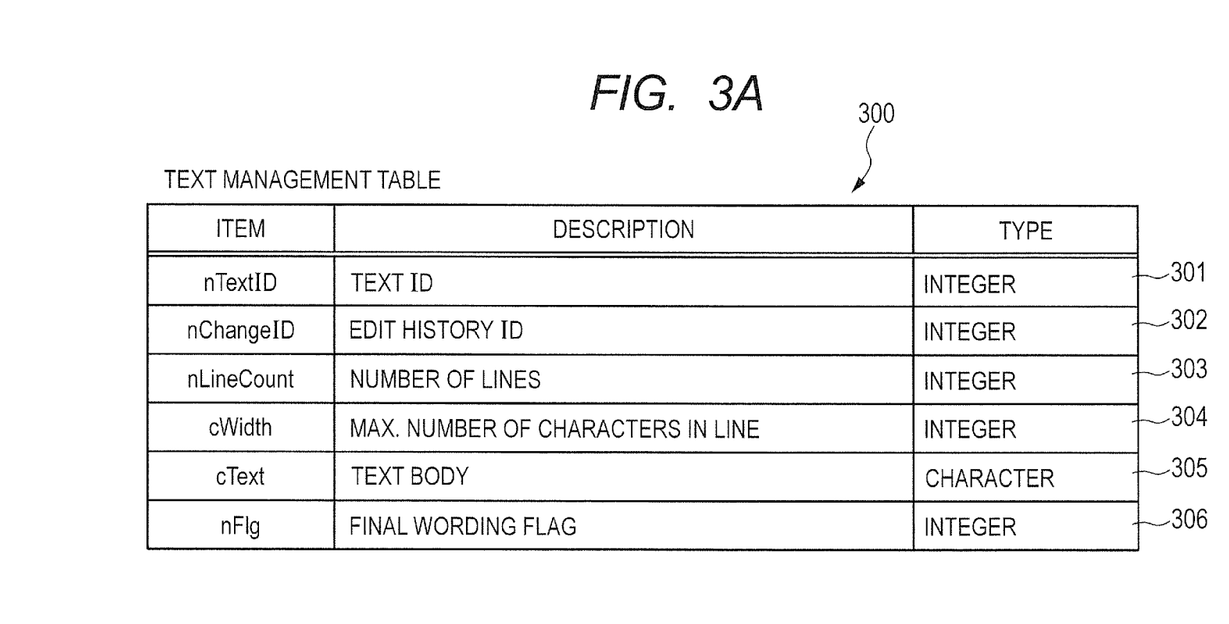
FIG. 3A is a diagram illustrating a text management table according to the first embodiment of the present invention.
Figure 3B:
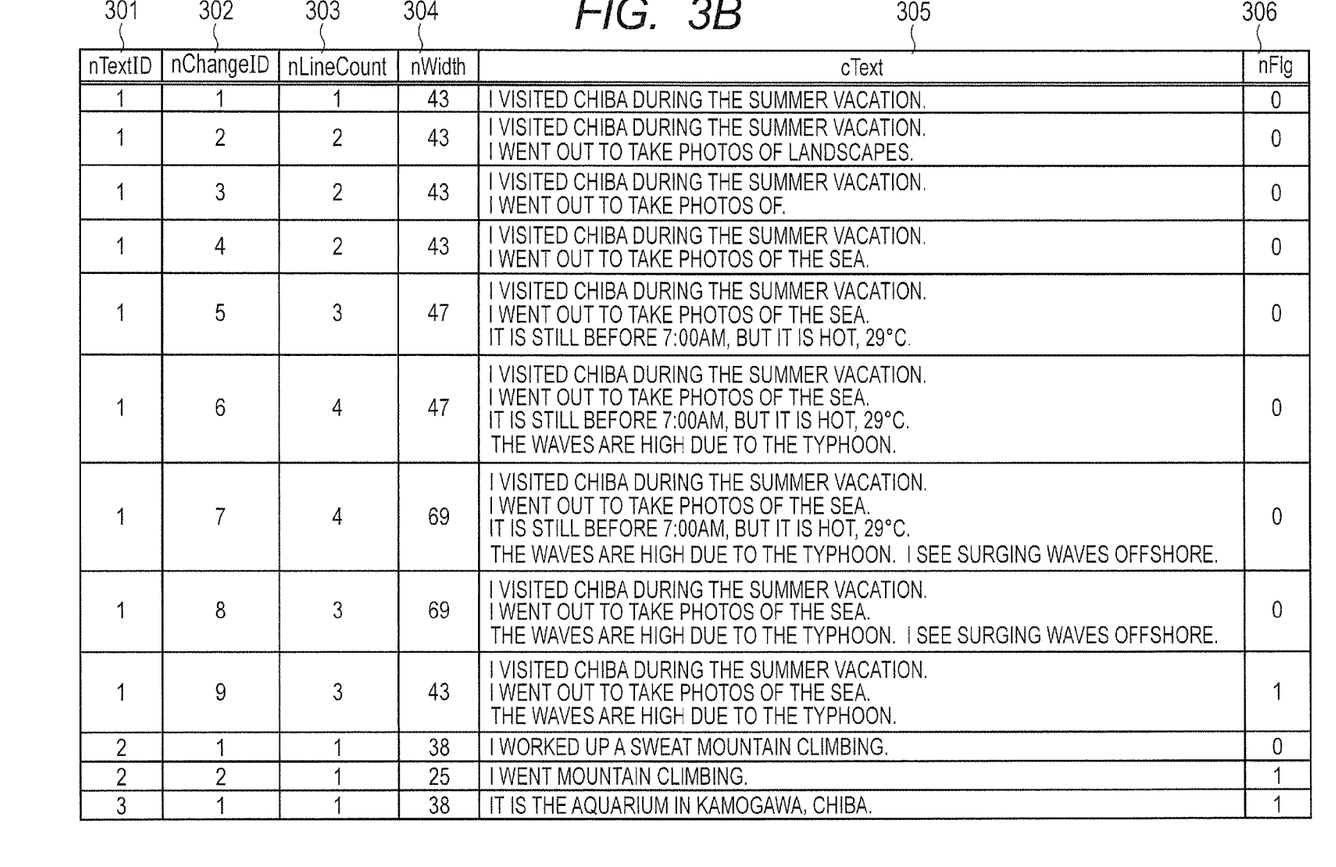
FIG. 3B illustrates an example of a text management table according to the first embodiment of the present invention.

Referring now to FIG. 2, FIG. 3A and FIG. 3B, the data configuration of an electronic book created using the information processing apparatus 100 will be described.

FIG. 2 is a diagram illustrating an example of book data according to the present embodiment. Book data 200 includes various types of information required to constitute an electronic book and has a hierarchical structure. The hierarchical structure comprises book information 201, page information 202, and image information 203 in order from an upper layer. The book information 201 and the page information 202 include links to lower layers.

The book information 201 is the information regarding an entire electronic book, and mainly includes a book ID 211, a book title 212, and the total number of pages 213. The page information 202 is the information regarding each page and mainly includes page numbers 221 that identify pages in the electronic book, and page layout IDs 222. The image information 203 is the information regarding each image and mainly includes image links 231 that indicate the file paths of the images to be arranged in each page, the arrangement positions 232 at which the images are to be placed on each page, image clipping areas 233, and text IDs 234 associated with the images. If an image is placed in a double-page spread layout template, the image information 203 is linked to the page information 202 for one page of the two pages constituting the double-page spread.

FIG. 3A is a diagram illustrating a text management table according to the present embodiment. A text management table 300 includes a text ID 301, an edit history ID 302, a number of lines 303, a maximum number of characters in a line 304, a text body 305, and a final wording flag 306. The text management table 300 manages the number of lines 303, the maximum number of characters in a line 304, the text body 305, and the final wording flag 306 by using the text ID 301 and the edit history ID 302 as the keys.

The text ID (nTextID) 301 is managed on the one-to-one basis with an image placed in the template as the text ID 234 in the image information 203 of the book data 200. The text ID 301 is given a number in a sequential order each time a template is selected.

The edit history ID (nChangeID) 302 is used for saving an edited text as a new record rather than overwriting it when saving. The edit history ID 302 is incrementally issued with respect to the same text ID 301, and managed in association with the text body 305. The use of the text ID 301 and the edit history ID 302 enables the texts edited by a user to be saved in a time series on the basis of edit time, thus permitting the management thereof. The text management table 300 may include a time stamp that indicates the date and time when the text was saved.

The number of lines (nLineCount) 303 denotes the number of lines of the text body 305 at the time of saving. The maximum number of characters in a line (nWidth) 304 denotes the maximum number of characters in the lines included in the text body 305 at the time of saving. The number of lines 303 and the maximum number of characters in a line 304 are used as the references for selecting an appropriate text body 305 among a plurality of text bodies 305 corresponding to the same text ID 301 when the template is switched.

The text body (cText) 305 is a text entered by the user onto the text editing screen. As illustrated in FIG. 3B, the text body 305 is saved in a time series each time the text is edited. Regarding the final wording flag (nFlg) 306, the value of "1 (=flag ON)" is set for the text body 305 determined to be placed in a template. The final wording flag 306 is set for only one of a plurality of edit history IDs 302 corresponding to the same text ID 301, thereby uniquely defining the text body 305 to be placed in the template.

Referring now to FIG. 4A, FIG. 4B, FIG. 5A, FIG. 5B, FIG. 6 and FIG. 7, the operation screens of the electronic book building system will be described. The operation screens are displayed on the display unit 111 and changed by the input operations performed by the user.

Figure 4A:
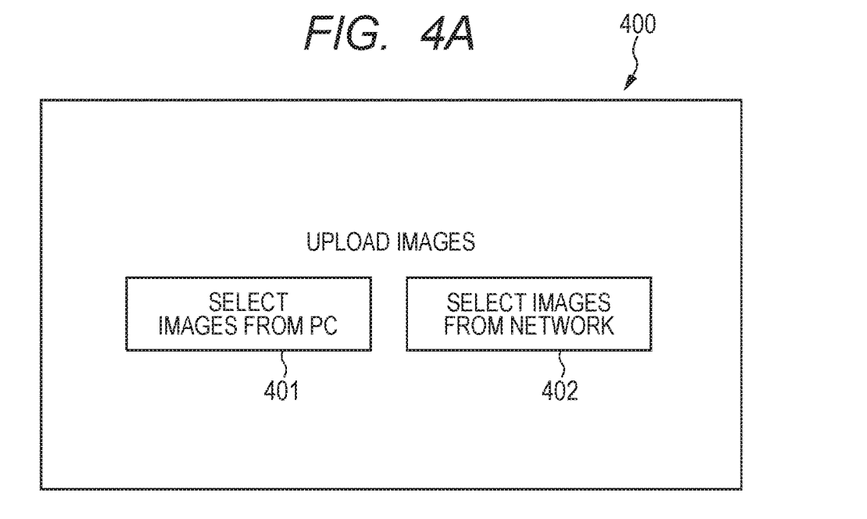
FIG. 4A illustrates an example of an image source setting screen according to the first embodiment of the present invention.

FIG. 4A illustrates an example of an image source setting screen according to the present embodiment. An image source setting screen 400 is for setting an image source of an image to be placed in a template. The image source setting screen 400 displays image source setting buttons 401 and 402. The image source setting button 401 is used to set the HDD 104 of the information processing apparatus 100 as the image source. The image source setting button 402 is used to set a storage on the network 110 as the image source.

Figure 4B:
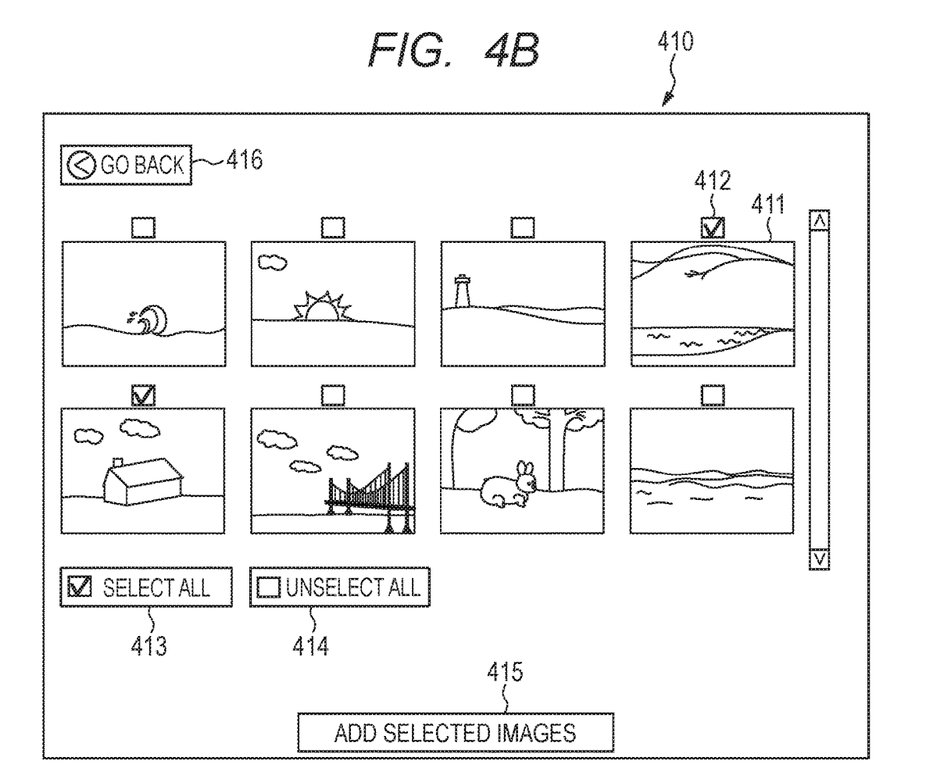
FIG. 4B illustrates an example of an image list screen according to the first embodiment of the present invention.

FIG. 4B illustrates an example of an image list screen according to the present embodiment. An image list screen 410 is for selecting an image to be placed in a template. The image list screen 410 displays thumbnails 411, checkboxes 412, a select all button 413, an unselect all button 414, an add selected image button 415, and a back button 416. The thumbnails 411 show, in a thumbnail manner, the images stored in an image source. The checkboxes 412 are used to select the corresponding thumbnails 411. The select all button 413 is used to select all the thumbnails 411. The unselect all button 414 is used to unselect all the images (the thumbnails 411). The add selected image button 415 is used to end the processing for selecting images. The back button 416 is used to return to the image source setting screen 400.

Figure 5A:
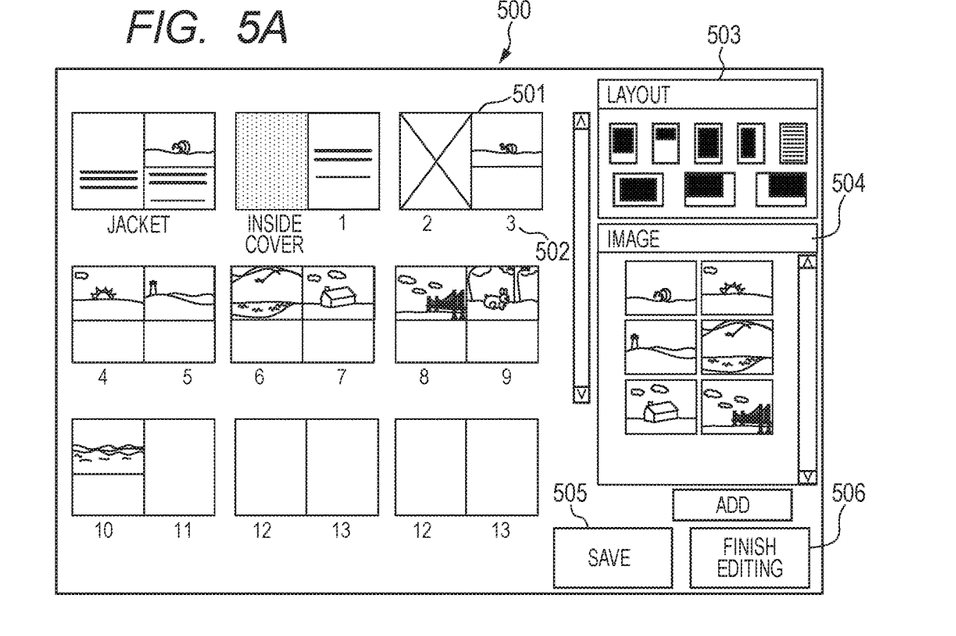
FIG. 5A illustrates an example of a page list screen according to the first embodiment of the present invention.

FIG. 5A illustrates an example of a page list screen according to the present embodiment. A page list screen 500 displays a plurality of arranged pages to be included in an electronic book. The page list screen 500 displays pages 501, page numbers 502, a layout list 503, a selected image list 504, a save button 505, and a complete button 506. The pages 501 are double-page spreads of the electronic book, and the page numbers 502 are the numbers assigned to the individual pages of the electronic book.

The layout list 503 shows the icons of various types of templates having different layouts. The user can change the templates of the pages 501 by dragging the icons from the layout list 503 and dropping the icons onto the pages 501. The selected image list 504 displays the thumbnails selected on the image list screen 410. The user can place images on the pages 501 by dragging the thumbnails from the selected image list 504 and dropping onto the pages 501. Neither the method nor the user interface (UI) for switching the templates particularly limits the present invention.

The save button 505 is used to save the electronic book being created. The electronic book being created is saved in the HDD 104 or the like by depressing the save button 505, and the creation of the electronic book can be resumed from the saved state. In the present embodiment, the description of the UI for selecting the saved electronic book will be omitted. The complete button 506 is used to proceed to the processing for printing the electronic book that has been completed.

In the page list screen 500, if the display area of the display unit 111 is not sufficiently large, only some pages of all pages are displayed, and the range of the displayed pages is changed as the user performs a scrolling operation. In the example illustrated in FIG. 5A, the pages up to page 13 corresponding to a scrolling position out of all the pages included in the electronic book are displayed, the images having been placed on the pages up to page 10.

Figure 5B:
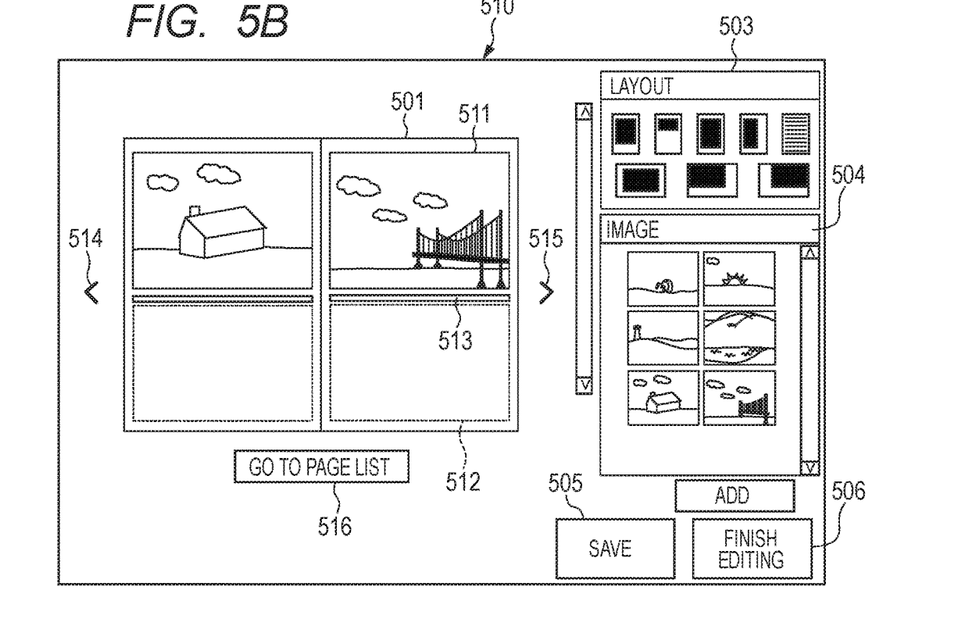
FIG. 5B illustrates an example of a detailed page screen according to the first embodiment of the present invention.

FIG. 5B illustrates an example of a detailed page screen according to the present embodiment. A detailed page screen 510 enables a text to be placed on a displayed page. The detailed page screen 510 displays an image area 511, a text area 512, a text editing UI 513, a page turning UIs 514, 515, and a page list button 516. The detailed page screen 510 further displays the layout list 503, the selected image list 504, the save button 505, and the complete button 506. An image is placed in the image area 511, and a text is placed in the text area 512. The text editing UI 513 is used to display the text editing screen. The page turning UIs 514, 515 are used to turn the page 501 to be displayed to a preceding or following page. The page list button 516 is used to return to the page list screen 500. The layout list 503, the selected image list 504, the save button 505, and the complete button 506 are the same as those displayed on the page list screen 500, so that the description thereof will be omitted.

Figure 6:
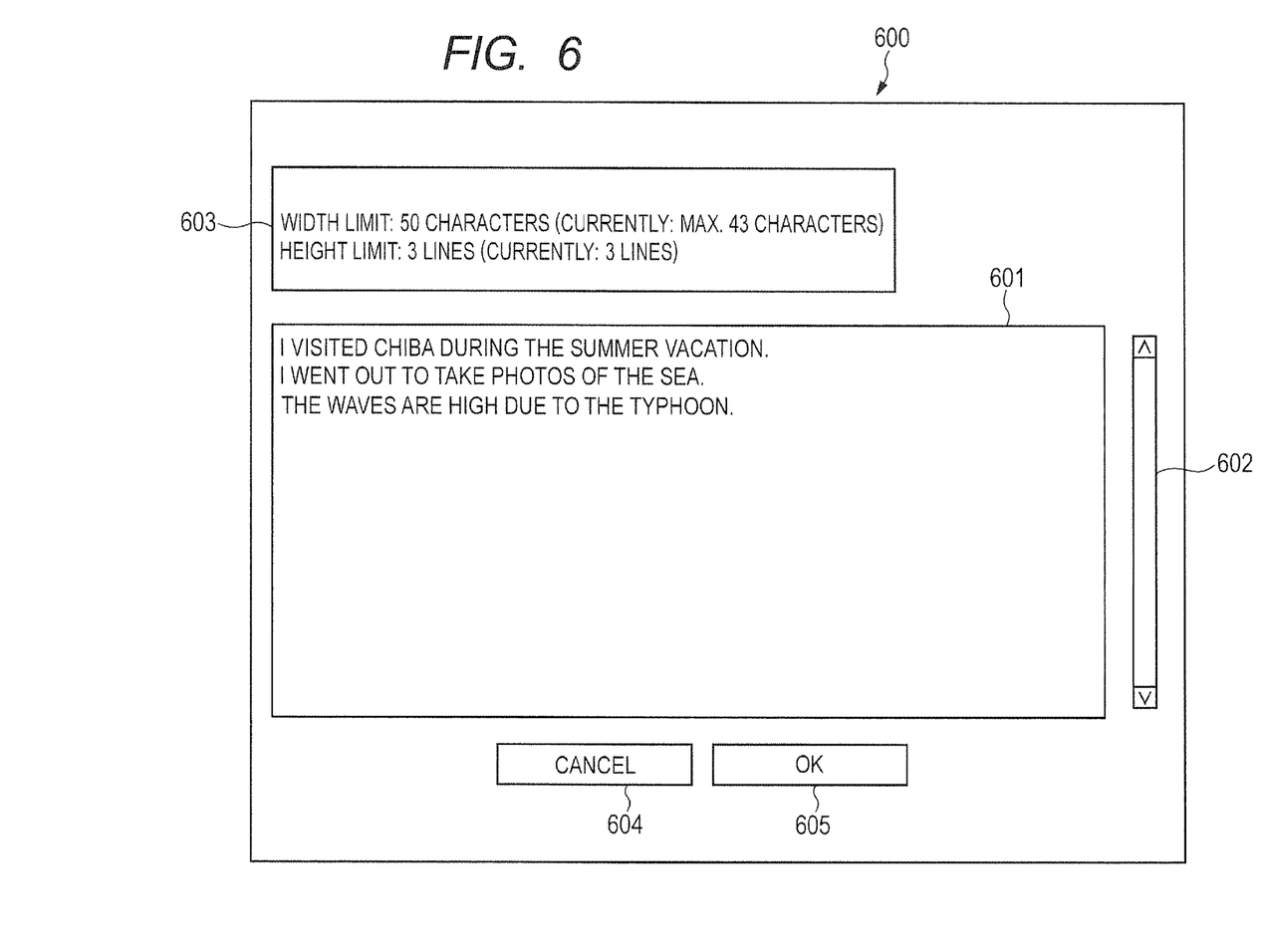
FIG. 6 illustrates an example of a text editing screen according to the first embodiment of the present invention.

FIG. 6 illustrates an example of the text editing screen according to the present embodiment. A text editing screen 600 displays an input area 601, a scroll bar 602, a text amount display 603, a cancel button 604, and an OK button 605. The input area 601 is the area where the user enters and edits a text, and displays the entered text. The scroll bar 602 is used to scroll a text displayed in the input area 601. The text amount display 603 shows the upper limit of the amount of a text that can be placed in the text area 512 in comparison with the amount of the text that has currently been entered in the input area 601. In this case, the upper limit of the text amount is defined on the basis of the width and the height of the text area 512 and by using the maximum number of characters in a line and the number of lines. The cancel button 604 is used to end the editing of a text without transferring a text in the input area 601 into the text area 512. The OK button 605 is used to finish the editing of a text after transferring a text in the input area 601 into the text area 512.

Figure 7:
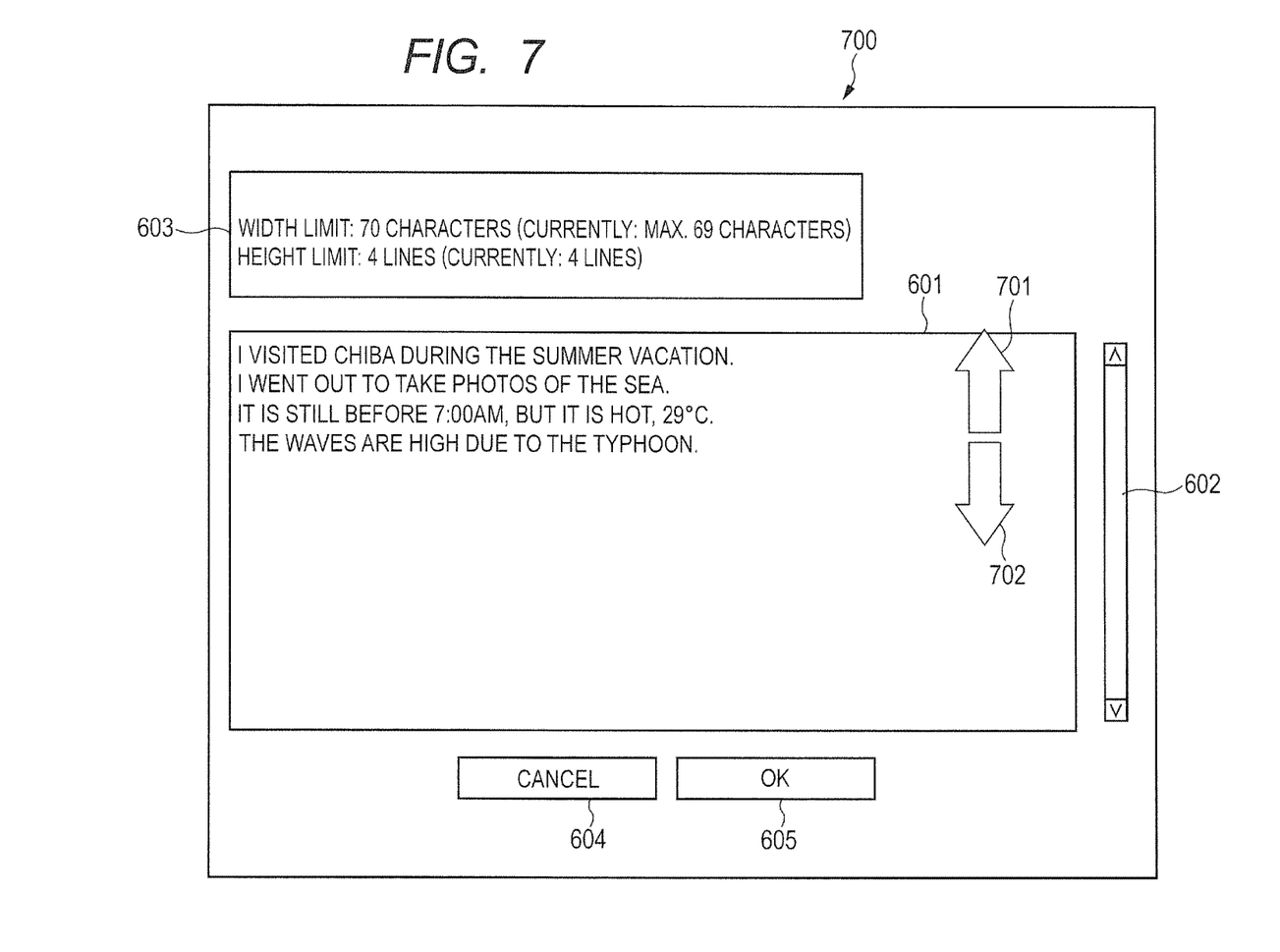
FIG. 7 illustrates another example of the text editing screen according to the first embodiment of the present invention.

FIG. 7 illustrates an example of the text editing screen according to the present embodiment. A text editing screen 700 appears when a template is switched. The text editing screen 700 displays the input area 601, the scroll bar 602, the text amount display 603, the cancel button 604, the OK button 605, and history display UIs 701, 702. The input area 601, the scroll bar 602, the text amount display 603, the cancel button 604, and the OK button 605 are the same as those displayed on the text editing screen 600 illustrated in FIG. 6. The history display UIs 701, 702 are used to display the edit history of the text displayed in the input area 601. The shapes of the history display UIs 701, 702 are not limited to the arrow-like shapes and may be any other shapes insofar as the shapes enable a user to intuitively recognize that the shapes denote UIs for displaying the edit history of a text.

Figure 8:
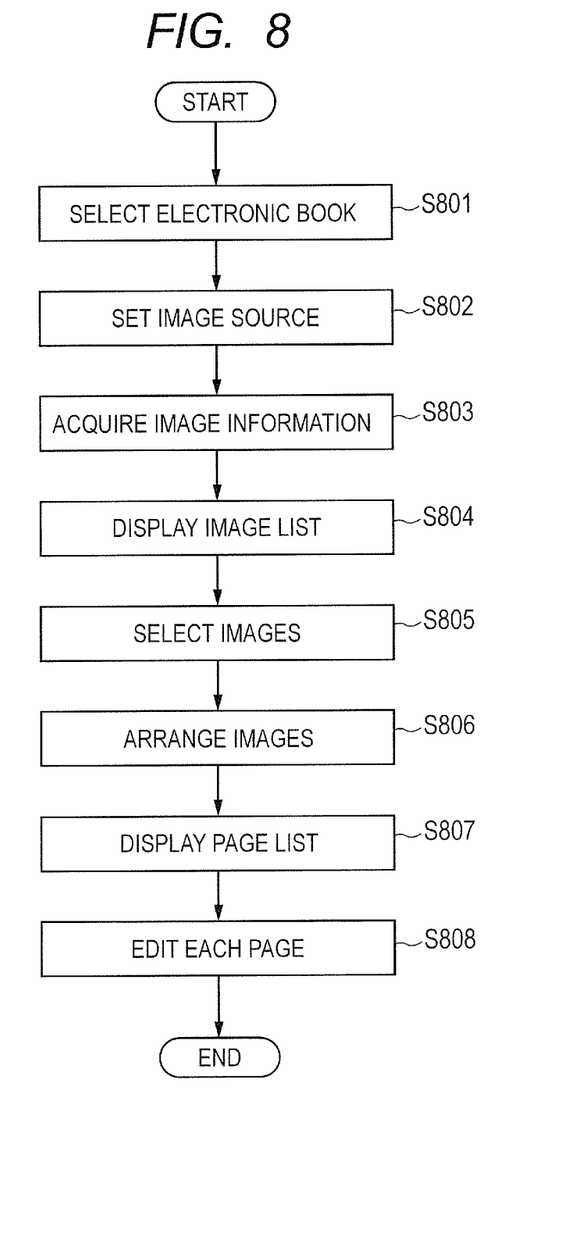
FIG. 8 is a flowchart illustrating the processing for creating an electronic book according to the first embodiment of the present invention.
Figure 9:
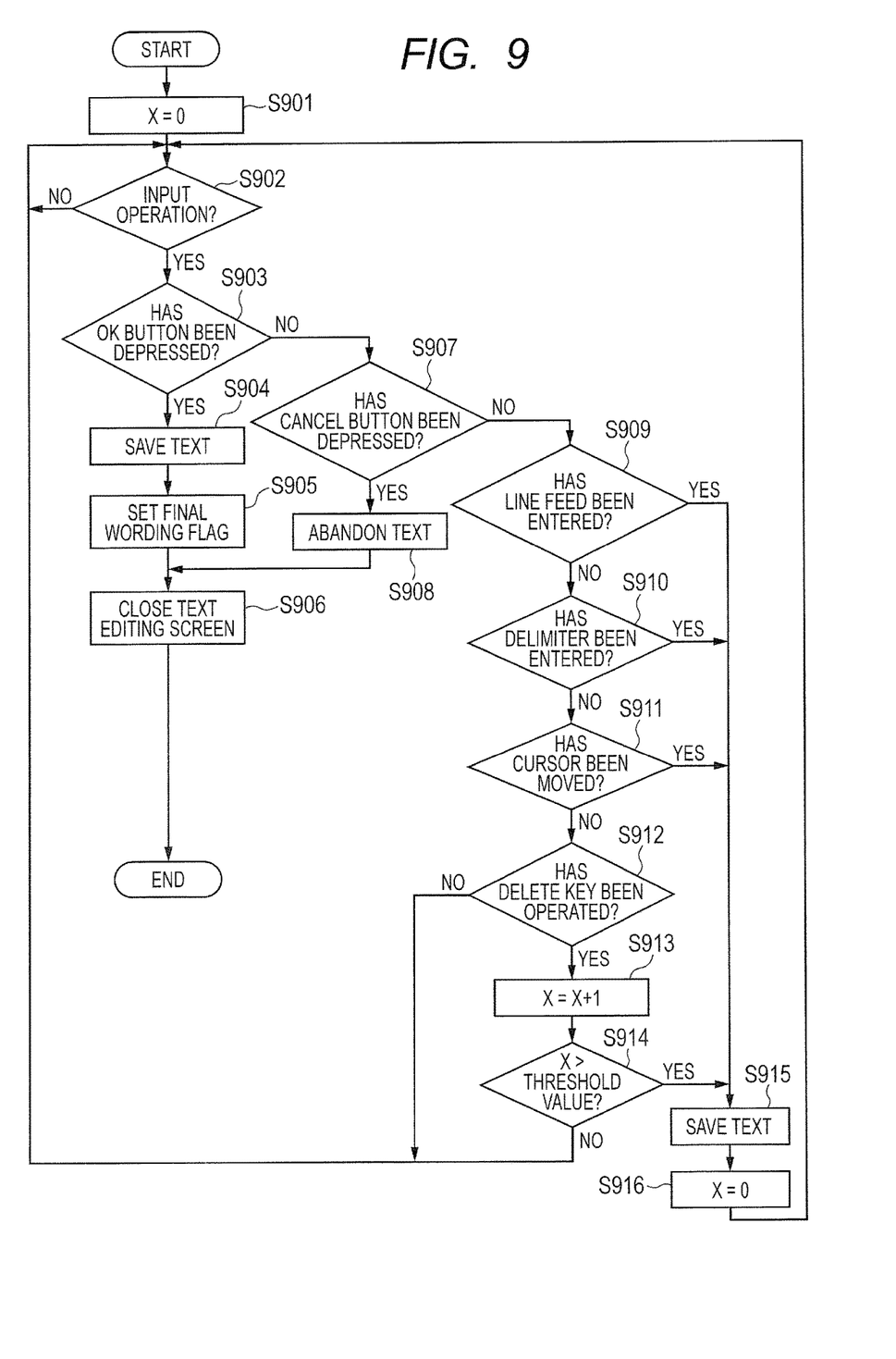
FIG. 9 is a flowchart illustrating the processing for editing a text according to the first embodiment of the present invention.
Figure 10:
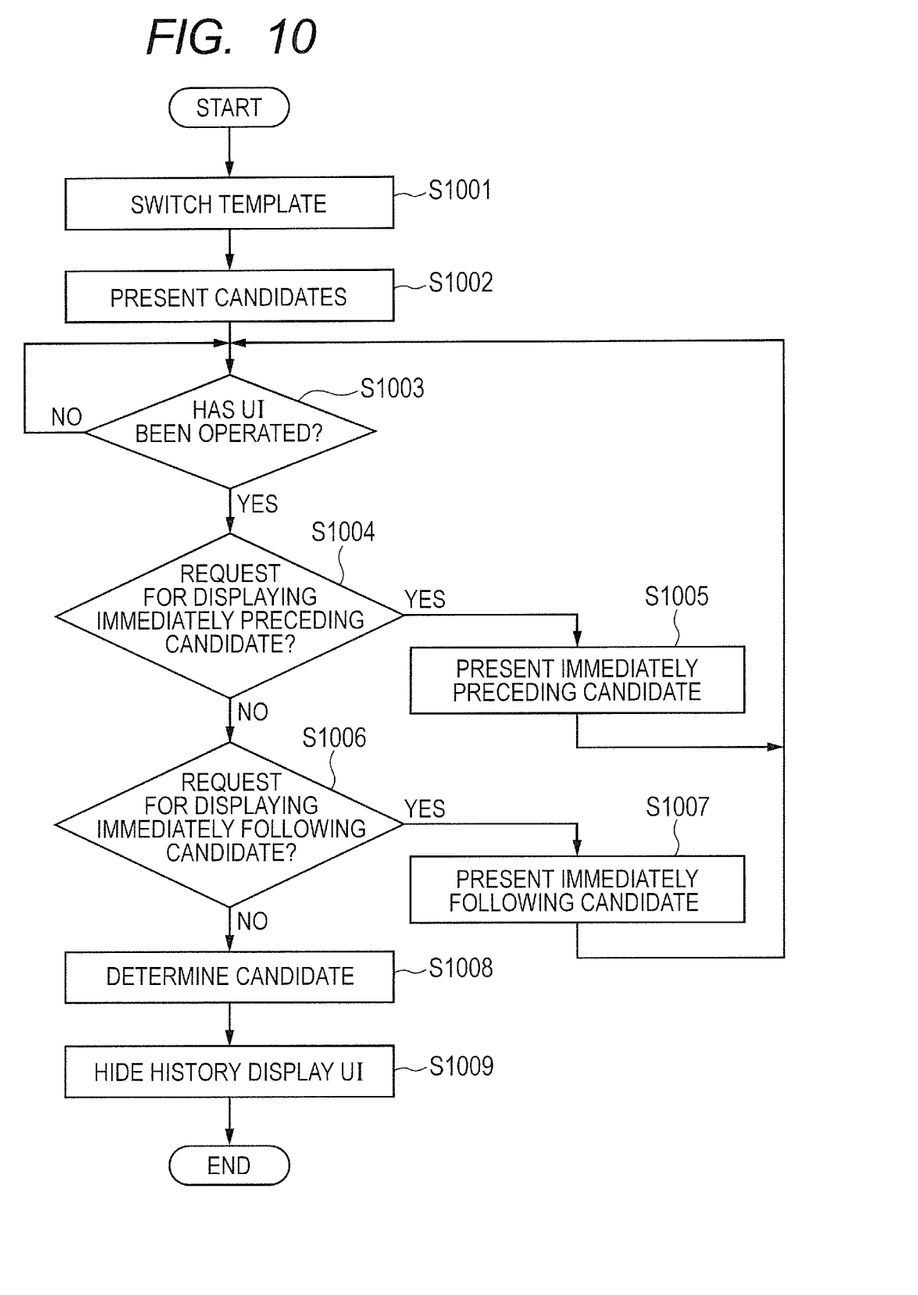
FIG. 10 is a flowchart illustrating the processing for switching a template according to the first embodiment of the present invention.

Referring now to FIG. 8 to FIG. 10, the operation of the information processing apparatus 100 according to the present embodiment will be described. The processing described below is realized by the CPU 101 of the information processing apparatus 100 reading the photo apparatus from the HDD 104 and controlling the aforesaid units according to the photo app.

FIG. 8 is a flowchart illustrating the processing for creating an electronic book according to the present embodiment. First, the CPU 101 selects an electronic book to be processed in response to an operation by a user (step S801). If the selected electronic book has already been stored in the HDD 104, then the CPU 101 reads the book ID of the electronic book from the HDD 104. If the selected electronic book is new, then the CPU 101 generates a new book ID.

Then, the CPU 101 sets the image source of an image to be placed in a template (step S802). More specifically, the CPU 101 causes the image source setting screen 400 illustrated in FIG. 4A to appear on the display unit 111. Then, the CPU 101 detects that the user has depressed (clicked) one of the image source setting buttons 401 and 402, and sets the image source corresponding to the depressed button as the image source.

Next, the CPU 101 acquires image information from the selected image source (step S803). More specifically, if the image source setting button 401 is depressed, the CPU 101 acquires image information, including images, the thumbnails related to the images, and the file names of the images, from the HDD 104. Meanwhile, if the image source setting button 402 is depressed, the CPU 101 accesses a storage on the network 110 through the network I/F 108 to acquire image information.

Next, based on the acquired image information, the CPU 101 generates the image list screen 410 illustrated in FIG. 4B and causes the generated image list screen 410 to appear on the display unit 111 (step S804). The CPU 101 then selects images to be used from among the acquired images in response to an operation by the user (step S805). More specifically, the CPU 101 selects the images of the thumbnails 411 for which the user has set the checkboxes 412 to ON. The image selection method is not limited to the one in the present embodiment, and may be any other methods insofar as the methods are adapted to use selected images to automatically create an electronic book. For example, a method may be used, in which the thumbnails 411 are depressible buttons and the thumbnails are depressed to select images.

Next, the CPU 101 places the selected images on pages of the electronic book according to the selection order (step S806). Subsequently, the CPU 101 generates the page list screen 500 illustrated in FIG. 5A and causes the generated page list screen 500 to appear on the display unit 111 (step S807).

Lastly, the CPU 101 carries out the editing of each page in response to an operation by the user (step S808). More specifically, when the CPU 101 detects that the user has depressed the page 501 on the page list screen 500, the CPU 101 causes the detailed page screen 510 illustrated in FIG. 5B to appear on the display unit 111. Then, when the CPU 101 detects that the user has depressed the text editing UI 513, the CPU 101 causes the text editing screen 600 illustrated in FIG. 6 to appear in a separate window on the display unit 111.

Each time the text in the input area 601 is edited, the CPU 101 updates the information given in the text amount display 603. If the text amount exceeds the upper limit of the height (the number of lines) or the width (the number of characters in a line) of the text area 512, the CPU 101 may display the text amount display 603 in a highlighting color, such as red. This enables the CPU 101 to notify the user that the text amount has exceeded the upper limit.

In step S808, the CPU 101 performs the processing for saving the edited text, the processing for switching the template or the like, which will be described later with reference to FIG. 9 and FIG. 10. When the CPU 101 detects that the user has depressed the complete button 506, the CPU 101 finishes the processing for creating the electronic book.

When the processing for creating the electronic book is finished, the CPU 101 proceeds to an electronic book print order flow. Based on the created electronic book, the CPU 101 generates printing data. The operation screen changes to a screen for print order. The user enters the ordered number of copies, the information on an orderer, the information on a shipping address, the information on payment and the like. In the present embodiment, the description of the UI related to the order placed by the user will be omitted. However, the UI related to an order does not limit the present invention.

FIG. 9 is a flowchart illustrating the processing for editing a text according to the present embodiment. This processing is carried out when the text editing screen 600 appears in step S808 of FIG. 8.

First, the CPU 101 assigns zero to a variable X (step S901). The variable X is for saving the number of successive depressions of a DELETE key.

The CPU 101 determines whether the user has performed an input operation on the text editing screen 600 (step S902). If there has been no input operation ("No" in step S902), the CPU 101 repeats the determination processing. If the input unit 109 has accepted an input operation by the user ("Yes" in step S902), the CPU 101 proceeds to the processing from step S903 and after.

If the input operation is the depression of the OK button ("Yes" in step S903), the CPU 101 stores the text being edited and displayed in the text editing screen 600 in the text management table 300 (step S904). The CPU 101 incrementally issues numbers for the edit history IDs 302, and stores the contents entered in the input area 601 in the text body 305, the number of the lines of the text in the number of lines 303, and the maximum value of the number of characters in the lines of the text in the maximum number of characters in a line 304.

Subsequently, the CPU 101 sets the final wording flag 306 to the record of the edit history ID 302 saved in step S904 (step S905). Then, the CPU 101 closes the text editing screen 600 and displays the detailed page screen 510 (step S906). In this case, the text saved in step S904 is displayed in an appropriate page area of the detailed page screen 510. This enables the user to finish entering the text in the input area 601, record the text in the HDD 104 or the like, and then edit another page.

If the input operation is the depression of the cancel button ("No" in step S903 and "Yes" in step S907), the CPU 101 abandons the text being edited in the input area 601 (step S908) and proceeds to the processing in step S906. In other words, the CPU 101 closes the text editing screen 600 without updating the text management table 300 and displays the detailed page screen 510. This enables the user to cancel the input of the text and edit another page without recording the text edited in the input area 601 in the HDD 104 or the like. In this case, the screen is changed without setting the final wording flag 306, so that the text of the edit history ID that is older than the text saved in step S909 and after will be the text adopted for the last time. In other words, the contents of the text of the latest edit history ID may not be reflected on the text area 512.

If the input operation is entering a line feed ("No" in steps S903 and S907, and "Yes" in step S909), the CPU 101 determines that the editing operation has proceeded on a line basis, and incrementally issues numbers for the edit history IDs of the text management table 300. The CPU 101 then saves, in the text body 305, the contents entered in the input area 601 (step S915). The CPU 101 initializes the value of the variable X (assigning zero) (step S916) and returns to step S902 to wait for another input operation. At this time, the CPU 101 saves the text in the input area 601 as the text in the process of editing rather than the text determined by the user to place in the text area 512. Hence, the CPU 101 will not set the final wording flag 306 for the saved text (flag OFF).

If the input operation is entering a delimiter ("No" in steps S903, S907 and S909, and "Yes" in step S910), the CPU 101 determines that the input processing by the user has reached a certain amount. The CPU 101 carries out the processing in steps S915 and S916, and returns to step S902 to wait for the next input. The "delimiter" in this case is defined for each language, for example, the delimiter refers to space, comma, period or the like. The delimiters are merely required to be properly defined according to a system, and the types of delimiters do not limit the present invention.

If the input operation is moving a cursor ("Yes" in S911), the CPU 101 determines that the user has completed the input of that particular line and intends to move to another line, or intends to move to correct a preceding character in the same line. The CPU 101 carries out the processing in steps S915 and S916, and returns to step S902 to wait for the next input.

If the input operation is depressing the DELETE key ("Yes" in S912), the CPU 101 increments the variable X (step S913). If the variable X exceeds a predetermined threshold value ("Yes" in step S914), the CPU 101 determines that the DELETE key has been successively depressed and the deletion processing by the user has reached a certain amount. The CPU 101 carries out the processing in steps S915 and S916, and returns to step S902 and waits for the next input. If the variable X is the predetermined threshold value or less ("No" in step S914), the CPU 101 returns to step S902 and waits for the next input.

FIG. 10 is a flowchart illustrating the processing for changing a template according to the present embodiment. This processing is carried out when the template is switched in step S808.

First, the CPU 101 switched the template in response to an operation by the user (step S1001). More specifically, in the page list screen 500 or the detailed page screen 510, the CPU 101 detects that the user has dragged one of the icons from the layout list 503 and dropped the icon into the page 501. Upon detection of such an operation, the CPU 101 switches the template. This changes the layout of the page 501.

Subsequently, the CPU 101 displays the text editing screen 700 illustrated in FIG. 7 and presents a text to be a candidate (step S1002). More specifically, in the text management table 300, the CPU 101 refers to all records corresponding to the text ID 301 of the text associated with the image of the page 501. Then, the CPU 101 compares the number of lines 303 and the maximum number of characters in a line 304 of the records with the upper limits of the number of lines and the maximum number of characters in a line specified in the template after switching. The CPU 101 selects the record having a smallest difference in the comparison, that is, the record having a text amount closest to the upper limit of the amount of a text that can be placed in the template after switching, and displays the text body 305 in the input area 601. If there are two or more candidates, then the CPU 101 presents, as the candidate, the text that has been edited later, that is, the text having a larger edit history ID 302. If there is no candidate, then the CPU 101 may not show the history display UIs 701, 702 or may display a message or the like indicating the absence of a candidate. Alternatively, a predetermined number of records may be selected in order, starting with the one closest to the upper limit of the amount of a text that can be placed in the template after switching.

Next, in the text editing screen 700, the CPU 101 determines whether the user has performed a UI operation (step S1003). If the user has not performed the UI operation ("No" in step S1003), the CPU 101 repeats the determination processing. If the input unit 109 accepts the UI operation performed by the user ("Yes" in step S1003), the CPU 101 proceeds to the processing of step S1004 and after.

If the user requests the display of an immediately preceding candidate ("Yes" in step S1004), the CPU 101 presents, as the new candidate, the text saved immediately preceding a candidate (step S1005). More specifically, the CPU 101 detects, from an input from the input unit 109, that the user has depressed the history display UI 701. Then, the CPU 101 selects, from the text management table 300, the record of the edit history ID 302 that is smaller than the presented record by one, and displays the text body 305 of the selected record in the input area 601 in place of the text for which the final wording flag 306 has been set. The CPU 101 returns to step S1003 and waits for the next UI operation.

If the user requests the display of an immediately following candidate ("Yes" in step S1006), then the CPU 101 presents, as the new candidate, the text saved immediately following a candidate (step S1007). More specifically, the CPU 101 detects, from an input from the input unit 109, that the user has depressed the history display UI 702. Then, the CPU 101 selects, from the text management table 300, the record of the edit history ID 302 that is larger than the presented record by one, and displays the text body 305 of the selected record in the input area 601. The CPU 101 returns to step S1003 and waits for the next UI operation.

If the CPU 101 detects that the user has operated a UI other than the history display UIs 701, 702 ("No" in step S1006), the CPU 101 determines the text in the input area 601 as the candidate (step S1008). For example, if the CPU 101 detects that the user has depressed the OK button 605, the CPU 101 assigns 1 to the final wording flag 306 of the record corresponding to the text in the input area 601. Further, the CPU 101 resets, by zero, the final wording flag 306 of other records having the same text ID 301 as that of the finalized candidate.

After finalizing the candidate, the CPU 101 hides the history display UIs 701, 702 (step S1009) and ends the processing of the flowchart. Thus, the text editing screen 700 becomes the same as the text editing screen 600 illustrated in FIG. 6, and the text determined as the candidate is displayed in the input area 601. Subsequently, the CPU 101 can start the processing of the flowchart of FIG. 9.

As described above, according to the present embodiment, edited texts are saved in a time series according to the edited date and time. When a template is switched, an appropriate text is presented to the user as the candidate from among the saved texts. The candidate is presented on the basis of the number of lines and the maximum number of characters in a line of the text when the text was saved. This makes it possible to present a text that will have a minimum character overflow from the text area or a minimum margin in the text area when the text is placed in the template. If the presented candidate is not the one that the user wanted, then a preceding or following text having a close edited date and time can be presented from among the edit history.

When saving a text, if a text is saved each time the user edits the text, the volume of data in the text management table 300 increases, and a storage area, such as the HDD 104, may be strained. According to the present embodiment, the determinations from step S909 to step S914 in FIG. 9 are made to save the edit history of a text each time a predetermined number of editing operations, including inputs and deletions, are performed. This makes it possible to reduce an increase in the volume of data of a text to be saved.

Other Embodiments

The present invention is not limited to the embodiment described above, and can be implemented in various modifications. For example, the information processing apparatus 100, the input unit 109, and the display unit 111 may be configured as an integral apparatus rather than being separate units. The information processing apparatus 100 may be a single computer or a plurality of computers, as necessary.

If the information processing apparatus 100 is a plurality of computers, the individual functions of the information processing apparatus 100 are assigned to the plurality of computers, and the individual computers are connected through a LAN or the like to permit mutual communication.

Further, the information processing apparatus 100 may be provided with an interface having a detachable, portable storage medium, such as a memory card. The display unit 111 may be provided with a touch panel that has a touch sensor. In this case, the display unit 111 functions also as the input unit 109.

In the above-described embodiment, the description has been given of the case where the left binding electronic book (the right side opens) is created using a photo app for handling images and texts of lateral writing with respect to the images. However, the binding method does not limit the present invention, and the same advantages as those of the above-described embodiment can be obtained for a right binding electronic book by reversing left and right. For handling a text of vertical writing, right binding is usually used, so that an example of the right binding can be applied.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-100716, filed May 19, 2016, which is hereby incorporated by reference herein in its entirety.

What is claimed is:

1. An information processing apparatus comprising:
at least one memory storing instructions; and
at least one processor that, upon executing the stored instructions, functions as
an inputting unit for inputting text to be placed in a template;
a storage unit for saving the text whenever a predetermined condition is detected; and
a presenting unit for, when the template is switched, selecting the text from the storage unit based on an amount of text that can be placed in the template after switching, and presenting the selected text as a candidate,
wherein the storage unit saves the text upon detecting successive operations of a delete key.

2. The information processing apparatus according to claim 1, wherein the presenting unit presents the text saved immediately preceding or following the candidate.

3. The information processing apparatus according to claim 1, wherein the storage unit saves the text upon detecting an input of a line feed.

4. The information processing apparatus according to claim 1, wherein the storage unit saves the text upon detecting an input of a delimiter.

5. The information processing apparatus according to claim 1, wherein the storage unit saves the text upon detecting a movement of a cursor.

6. The information processing apparatus according to claim 1, wherein the template is for creating an electronic book.

7. The information processing apparatus according to claim 1, wherein the text is saved in the storage unit in a time series based on an input date and time thereof.

8. The information processing apparatus according to claim 1, wherein a text having a text amount that is closest to an upper limit of the amount of a text that can be placed in the template after switching is selected from among texts saved in the storage unit.

9. An information processing method comprising:
inputting text to be placed in a template;
saving the text in a storage whenever a predetermined condition is detected; and
when the template is switched, selecting the text from the storage based on an amount of text that can be placed in the template after switching and presenting the selected text as a candidate,
wherein the storage saves the text upon detecting successive operations of a delete key.

10. A non-transitory computer readable medium having a program recorded therein for causing an information processing apparatus to perform:
inputting text to be placed in a template;
saving the text in a storage whenever a predetermined condition is detected; and
when the template is switched, selecting the text from the storage based on an amount of text that can be placed in the template after switching and presenting the selected text as a candidate,
wherein the storage saves the text upon detecting successive operations of a delete key.

* * * * *